US012752188B2

(12) United States Patent
Chen

(10) Patent No.: US 12,752,188 B2
(45) Date of Patent: Oct. 6, 2026

(54) METHOD FOR DISPLAYING VIRTUAL INTERACTIVE OBJECT, AND ELECTRONIC DEVICE AND STORAGE MEDIUM THEREOF

(71) Applicant: NETEASE (HANGZHOU) NETWORK CO., LTD., Hangzhou (CN)

(72) Inventor: Siqi Chen, Hangzhou (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 192 days.

(21) Appl. No.: 18/291,608

(22) PCT Filed: May 19, 2022

(86) PCT No.: PCT/CN2022/093893
§ 371 (c)(1),
(2) Date: Jan. 24, 2024

(87) PCT Pub. No.: WO2023/024603
PCT Pub. Date: Mar. 2, 2023

(65) Prior Publication Data
US 2025/0083043 A1 Mar. 13, 2025

(30) Foreign Application Priority Data
Aug. 26, 2021 (CN) ......................... 202110987821.9

(51) Int. Cl.
*A63F 13/537* (2014.01)

(52) U.S. Cl.
CPC .................................. *A63F 13/537* (2014.09)

(58) Field of Classification Search
CPC .. A63F 13/537; A63F 13/2145; A63F 13/426; A63F 13/56; A63F 13/822; A63F 13/63; A63F 13/5378
See application file for complete search history.

(56) References Cited

U.S. PATENT DOCUMENTS 6,196,917 B1 * 3/2001 Mathias ................ A63F 13/812 463/2
8,142,286 B2 * 3/2012 Sayyadi .................. A63F 13/22 463/43

(Continued)

FOREIGN PATENT DOCUMENTS

CN 1932799 A 3/2007
CN 102625938 A 8/2012

(Continued)

OTHER PUBLICATIONS

1st Office Action dated Dec. 22, 2023 of Chinese Application No. 202110987821.9.

(Continued)

*Primary Examiner* — Grant Sitta
(74) *Attorney, Agent, or Firm* — Qinghong Xu

(57) ABSTRACT

A method for displaying a virtual interactive object, and an electronic device, and a non-transitory computer-readable storage medium are provided. The method includes providing a graphical user interface by a terminal device, where a virtual character in a game scene is displayed on the graphical user interface, the game scene comprises a virtual interactive object; entering a browse mode in response to a browse mode switch trigger command, and determining a movement path of the virtual character; arranging the virtual interactive object according to the movement path, and determining a display region of the arranged virtual interactive object in the game scene; controlling the virtual character to move at a preset speed in the game scene (Continued)

according to the movement path; and displaying the virtual interactive object according to a real-time movement position of the virtual character and the display region.

20 Claims, 8 Drawing Sheets

(56) References Cited

U.S. PATENT DOCUMENTS

| | | | | |
|---|---|---|---|---|
| 8,328,611 | B2 * | 12/2012 | Sano | A63F 13/426 463/31 |
| 9,737,819 | B2 * | 8/2017 | Desanti | A63F 13/822 |
| 10,702,777 | B2 * | 7/2020 | Haussila | G06F 3/0488 |
| 2003/0216177 | A1 * | 11/2003 | Aonuma | A63F 13/525 463/32 |
| 2010/0304859 | A1 * | 12/2010 | Yamada | A63F 13/2145 463/31 |
| 2011/0050732 | A1 | 3/2011 | Arrasvuori | |
| 2011/0319169 | A1 * | 12/2011 | Lam | A63F 13/533 463/43 |
| 2012/0122586 | A1 * | 5/2012 | Kelly | A63F 13/87 463/42 |
| 2017/0116667 | A1 | 4/2017 | High et al. | |
| 2018/0025415 | A1 | 1/2018 | Engel et al. | |
| 2020/0316473 | A1 * | 10/2020 | Qiu | A63F 13/56 |
| 2021/0299562 | A1 | 9/2021 | Zhou et al. | |
| 2022/0080299 | A1 | 3/2022 | Huang et al. | |

FOREIGN PATENT DOCUMENTS

| | | | |
|---|---|---|---|
| CN | 104156897 | A | 11/2014 |
| CN | 108022303 | A | 5/2018 |
| CN | 109272380 | A | 1/2019 |
| CN | 109876442 | A | 6/2019 |
| CN | 109993631 | A | 7/2019 |
| CN | 111530073 | A | 8/2020 |
| CN | 111815419 | A | 10/2020 |
| CN | 112691372 | A | 4/2021 |
| CN | 112915537 | A | 6/2021 |
| CN | 113680070 | A | 11/2021 |
| CN | 113786621 | A | 12/2021 |
| JP | 2003000940 | A | 1/2003 |
| KR | 20060024524 | A | 3/2006 |

OTHER PUBLICATIONS

1st Office Action dated Dec. 12, 2022 of Chinese Application No. 202110987783.7.

International Search Report dated Aug. 19, 2022 of International Application No. PCT/CN2022/093887.

International Search Report dated Aug. 17, 2022 of International Application No. PCT/CN2022/093893.

Notice of Allowance dated Nov. 4, 2025 of U.S. Appl. No. 18/567,383.

* cited by examiner

METHOD FOR DISPLAYING VIRTUAL INTERACTIVE OBJECT, AND ELECTRONIC DEVICE AND STORAGE MEDIUM THEREOF

CROSS-REFERENCE TO RELATED APPLICATIONS

The present disclosure is a U.S. National Phase Application of International Application No. PCT/CN2022/093893, filed on May 19, 2022, which is based on and claims priority to Chinese Patent Application No. 202110987821.9, filed on Aug. 26, 2021, entitled "METHOD AND APPARATUS FOR BROWSING VIRTUAL INTERACTION OBJECT, AND ELECTRONIC DEVICE AND STORAGE MEDIUM", the entire contents of both of which are incorporated herein by reference for all purposes.

TECHNICAL FIELD

The present disclosure relates to a field of information technology and more particularly, to a method for displaying a virtual interactive object and an apparatus for displaying a virtual interactive object, an electronic device, and a non-transitory computer-readable storage medium thereof based on information technology.

BACKGROUND

With the development of information technology, more and more users begin to use terminal devices, such as smart phones, that are capable of installing and running application programs to fulfill their personal entertainment needs. However, how to ensure and enhance the user's immersion in the entertainment process is a problem that developers have been working on for a long time.

It should be noted that the information disclosed above in the background section is only intended to enhance the understanding of the background of the present disclosure, and therefore, information that does not constitute the prior art known to those of ordinary skill in the art may be included.

SUMMARY

The present disclosure provides a method for displaying a virtual interactive object, an electronic device and a non-transitory computer-readable storage medium thereof.

According to a first aspect of the present disclosure, a method for displaying a virtual interactive object is provided, a graphical user interface is provided by a terminal device, at least a virtual character in a game scene is displayed on the graphical user interface, the game scene includes a virtual interactive object, and the method for displaying includes:

switching to, in response to a browse mode switch trigger command, a browse mode, and determining a movement path of the virtual character in the game scene;

arranging, according to the movement path, the virtual interactive object, and determining a display region of the arranged virtual interactive object in the game scene;

controlling the virtual character to move at a preset speed in the game scene according to the movement path; and displaying the virtual interactive object on the graphical user interface according to a real-time movement position of the virtual character and based on the display region of the arranged virtual interactive object in the game scene.

According to a second aspect of the present disclosure, an electronic device is provided, and includes a processor, and a memory for storing executable instructions of the processor, where the processor is configured to perform any one of the above method via performing the executable instructions.

According to a third aspect of the present disclosure, a non-transitory computer-readable storage medium having stored a computer program thereon is provided, the computer program, when executed by a processor, causes the processor to implement any one of the above method.

It should be understood that both the foregoing general description and the following detailed description are merely exemplary and explanatory and do not limit the present disclosure.

DETAILED DESCRIPTION

Figure 1:
FIG. 1 shows an interface diagram of a display mode of a stall in a game according to the related art.

Embodiments are now described more fully with reference to the accompanying drawings. However, these embodiments may be implemented in a variety of forms and should not be construed as being limited to the examples set forth herein; rather, these embodiments are provided so that the present disclosure will be more comprehensive and complete and will fully convey the concept of the embodiments to those skilled in the art. The features, structures, or characteristics described may be combined in one or more embodiments in any suitable manner. In the following description, numerous specific details are provided to give a full understanding of the embodiments of the present disclosure. However, those skilled in the art will appreciate that the technical solutions of the present disclosure may be practiced by omitting one or more of the specific details, or by using other methods, components, devices, steps, etc. In other instances, well-known technical solutions are not shown or described in detail to avoid becoming the focus of the present disclosure and obscuring various aspects of the present disclosure.

Furthermore, the drawings are merely schematic illustrations of the present disclosure and are not necessarily drawn to scale. The same reference numerals in the drawings denote the same or similar parts, and thus repeated descriptions thereof will be omitted. Some of the block diagrams shown in the drawings are functional entities and do not necessarily correspond to physically or logically separate entities. These functional entities may be implemented in software, or in one or more hardware modules or integrated circuits, or in different networks and/or processor devices and/or microcontroller devices.

The present disclosure relates to a method for displaying a virtual interactive object, which may be applied to a terminal device capable of presenting a graphical user interface and running a game program, such as a smart phone, a tablet, a personal computer, etc. In the game program, a corresponding virtual character controlled by each user may itself be used as a virtual interactive object, and the virtual character may trade with other users by setting up a stall, which is similar to a transaction function realized by a stall in a market in reality. Thus, in the following description, "stall" will be used as an example of "virtual interactive object" for illustration. The explanatory terms used, such as "stall setting" and "shopping", etc., may refer to interactive actions related to "stall" or the virtual interactive object in the game. It should be noted that in the embodiments of the present disclosure, in addition to the "stall", the "virtual interactive object" may also include other interactive object or an entry of the object in a game scene, such as an entry of a virtual transaction place fixedly arranged in a current scene (such as a weapons shop, a pawnshop, etc. in the game, which is different from a transaction stall freely set up by a player), an entry of a virtual scene (such as a temple, a restaurant and other scene in the game), a virtual prop (such as a key item used to complete a task in the game, such as a reel, a bamboo pole, herb, etc.), or other virtual character (such as a virtual character controlled by another player who does not have a stall, a key non-player character (NPC) used to promote a game process, and a non-key NPC distributed in the current scene to simulate realism, etc.), unless otherwise specified, the present disclosure does not specifically limit the virtual interactive object.

Taking a game program as an example, transaction of virtual props may be involved in the game, so the "stall setting" function was emerged. For example, a user may set up his/her own stall for trading in a game scene. At present, the user usually randomly picks any location in the game scene to set up the stall. Such a way may cause the setting and display of the stall to be messy and disorderly, which increases the difficulty for a user to select an required item in the stall; moreover, the user is required to control his/her virtual character to move back and forth across a wide range of scene to check each stall, resulting in increased user's fatigue and poor immersion.

In the related art associated with virtual interactive object browsing, as shown in FIG. 1, when a large number of virtual characters are gathered in the current game scene, and each virtual character freely sets up a stall in the scene, the game interface becomes particularly messy and disorderly. In this case, it is very difficult for the user to find a desired item from a large amount of stall information; and often the user even has to control the virtual character to run back and forth in the game scene in order to select the item from the numerous stall information, which significantly increases the user's fatigue in the game, and correspondingly has a negative impact on the user's game immersion. On the other hand, in a case that the stalls are particularly gathered in a certain region, a large amount of stall information may even block the entries of some virtual scenes (such as restaurants, theaters, etc.), virtual props or key NPCs, making it difficult for some users who are trying to experience other game content while shopping for an item to have a smooth experience, which may result in the user needing to control the virtual character to move and try repeatedly to interact with the above entries of the virtual scenes, the virtual props or the key NPCs, which further increases the user's fatigue and reduces the game immersion, and the problem is particularly prominent on a mobile terminal with a small display region.

A method for displaying a virtual interactive object in one of the embodiments of the present disclosure may run on a terminal device or a server. The terminal device may be a local terminal device. When the method for displaying the virtual interactive object runs on the server, the method may be realized and executed based on a cloud interactive system, where the cloud interactive system includes a server and a client device.

In an embodiment, various cloud applications, such as cloud games, can run under the cloud interactive system. Taking a cloud game as an example, the cloud game refers to a game method based on cloud computing. In an operating mode of the cloud game, the main body for running the game program and the main body for presenting the game screen are separated. The storage and running of the method for displaying the virtual interactive object are completed on the cloud game server. The client device is used for receiving and sending data, and presentation of game screens. For example, the client device may be a display device with data transmission function close to the user side, such as a mobile terminal, TV, computer, palmtop computer, etc.; but the terminal device that performs information processing is the cloud game server in the cloud. When playing a game, the player operates the client device to send an operation command to the cloud game server, the cloud game server runs the game according to the operation command, encodes and compresses the data such as the game screens, and returns it to the client device through the network, and finally the client device conducts decoding and outputs the game screens.

In an embodiment, the terminal device may be a local terminal device. Taking a game as an example, the local terminal device stores a game program and is used to present game screens. The local terminal device is used to interact with the player through the graphical user interface, i.e., the conventional way for downloading and installing a game program on an electronic device and running it. The local terminal device may provide the graphical user interface to the player in various manners, for example, rendering and displaying it on a display screen of the terminal, or providing it to the player through holographic projection. For example, the local terminal device may include a display screen and a processor, the display screen is used to present the graphical user interface, the graphical user interface including a game screen, and the processor is used to run the game, generate the graphical user interface, and control the display of the graphical user interface on the display screen.

In a possible embodiment, the embodiment of the present disclosure provides the method for displaying the virtual interactive object, in which a graphical user interface is provided by a terminal device. The terminal device may be the above local terminal device or the above client device in the cloud interactive system.

The technical solutions of the embodiments of the present disclosure are described in detail below.

Figure 2:
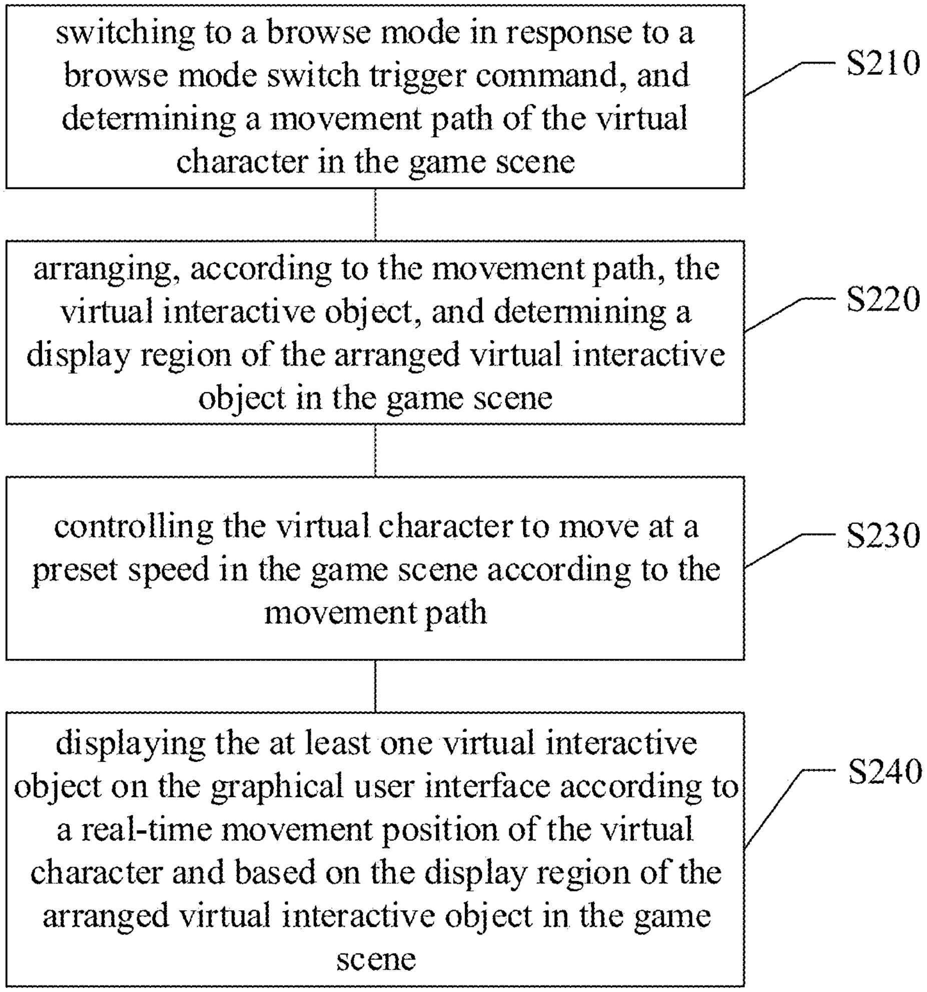
FIG. 2 shows a flowchart of a method for displaying a virtual interactive object according to an embodiment of the present disclosure.

The embodiment provides a method for displaying a virtual interactive object, a graphical user interface is provided by a terminal device, at least a virtual character in a game scene is displayed on the graphical user interface, and the game scene includes at least one virtual interactive object. As shown in FIG. 2, the method for displaying the virtual interactive object may include the following steps steps S210 to S240:

In step S210, the terminal device switches to a browse mode in response to a browse mode switch trigger command, and determines a movement path of the virtual character in the game scene;

In step S220, the virtual interactive object is arranged according to the movement path, and a display region of the arranged virtual interactive object in the game scene is determined;

In step S230, the virtual character is controlled to move at a preset speed in the game scene according to the movement path;

In step S240, the at least one virtual interactive object is displayed on the graphical user interface according to a real-time movement position of the virtual character and based on the display region of the arranged virtual interactive object in the game scene.

In the method for displaying the virtual interactive object provided by the embodiment of the present disclosure, on the one hand, the virtual interactive object is regularly displayed in the game scene along the movement path of the virtual character, which solves the problem of stall setup and messy display at least to a certain extent, reduces the difficulty for the user to select the stall of interest, avoids the need for the user to move the virtual character back and forth to find a suitable stall, and reduces the user's fatigue during the game. On the other hand, the virtual interactive object in the game is displayed along the movement path of the virtual character, such that the user may get a real experience of shopping and viewing stalls in the game scene similar to that in real life, and it also solves the problem that when there are a plurality of virtual interactive objects in the same scene, the interaction between the user and the corresponding object is affected since each virtual interactive object occludes each other, which helps to improve the user experience and enhance the user's immersion.

The above steps are described in more detail below in another embodiment.

In step S210, the terminal device switches to a browse mode in response to a browse mode switch trigger command, and determines a movement path of the virtual character in the game scene.

Figure 3:
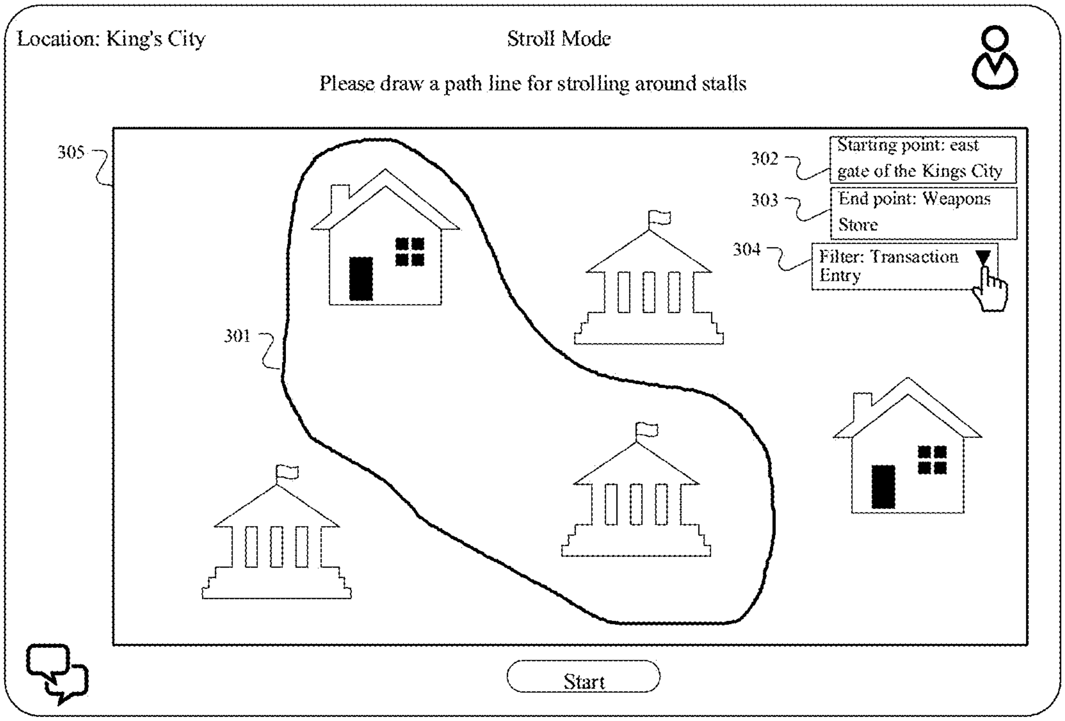
FIG. 3 shows an interface diagram in browse mode according to an embodiment of the present disclosure.

In this embodiment, the user may actively input a browse mode switch trigger command through a switch button such as "Stroll Mode" on the game interface. Upon detecting the browse mode switch trigger command, the terminal device may, for example, switch to the browse mode. In an example as shown in FIG. 3, after switching to the browse mode, e.g., named "Stroll Mode" in the game, a thumbnail map 305 of the current game scene may be generated on the interface, such that the user is able to determine the movement path of the virtual character for strolling around the stalls in the game scene through the thumbnail map 305.

In an example, the terminal device may determine the movement path by receiving path information input by the user. In a further example, the path information may include, for example, information on a path line drawn by the user or start and end point information input by the user. For example, in order to obtain an immersion experience corresponding to strolling around the stalls in reality, a movement path 301 of the virtual character of the game in the game scene may be determined by the user on the thumbnail map 305 in the browse mode, as shown in FIG. 3, to simulate the process of buyer shopping and viewing various virtual interactive objects according to his/her purchase plan in reality. The user may determine where the virtual interactive object of interest may be distributed in the current game scene, and may then draw by himself/herself the path line 301 that the virtual character is going to move through, e.g., by manually touch-drawing or dragging the mouse, on the thumbnail map 305 in the browse mode.

In addition, the user may, for example, input positions at start and end points of the movement path for strolling around the stalls in a start position input box 302 and an end position input box 303 provided in the browse mode, respectively. The positions at the start and end points may be the names of specific places in the game scene, such as the East Gate of the King's City and the Weapon store shown in FIG. 3. Furthermore, the user may, for example, click on a specific place in the thumbnail map 305 to obtain the name of the place or set it as the position at the start point or the end point of the movement path. Upon detecting the above start point and end point information, the terminal device may, for example, communicate with the server to generate a recommended route for the user to stroll around the stalls based on the distribution of each virtual interactive object in the game scene, for example, through a pathfinding algorithm such as an ant colony algorithm.

In addition, the path information may also include virtual interactive object filtering information. As mentioned above, the virtual interactive object may include, for example, the entry of the virtual transaction place, the entry of the virtual scene, the virtual prop or other virtual character in addition to the stall. As shown in FIG. 3, the user may input the virtual interactive object filtering information in a virtual interactive object filtering information input box 304 manually or by selecting from a drop-down menu according to his/her own browsing needs, so as to filter out the what he/she desires to browse, such as the transaction entry (such as a stall, a transaction place, etc.), the virtual prop, the NPC, etc. For example, in the example shown in FIG. 3, the user may choose to filter out the "transaction entry", so as to browse each stall and transaction place during the subsequent stroll. After the virtual interactive object that the user desires to browse is determined according to the above virtual interactive object filtering information, the terminal device may generate a recommended route for the user to stroll around the stalls based on the distribution of each filtered virtual interactive object in the game scene, for example, through the pathfinding algorithm such as the ant colony algorithm.

Through the above examples, the movement path of the virtual character may be flexibly determined in various ways, so as to better meet the needs of different users for generating different movement paths, improve the user experience in the process of strolling around the stalls, and help to enhance the game immersion.

In another example, after switching to the browse mode, the terminal device may hide a virtual interactive element that is displayed on the graphical user interface, in order to make the browse mode have a concise and clear interface effect. The virtual interactive element may include, for example, interactive controls, prompt text, information graphics, etc., on the UI layer. For example, after switching to the browse mode, the terminal device may stop rendering the interactive controls on the game interface such as skill bars, prop bars, and the like, and/or stop rendering the information graphics on the game interface such as "character status", "experience progress" and the like, and/or stop rendering a prompt text on the game interface such as chat information, quest prompts, and the like, so as to achieve the effect of hiding the above-mentioned virtual interactive elements.

Through the above examples, when switching to the browse mode, the graphical appearance of most of the virtual interactive elements on the game interface may be hidden, avoiding the graphical appearance of the virtual interactive elements from obscuring the virtual interactive object and the thumbnail map, so as to present the user with a concise and clear game interface, which helps to improve the user's immersion in the process of strolling around the stalls.

In step S220, the virtual interactive object is arranged according to the movement path, and a display region of the arranged virtual interactive object in the game scene is determined.

In the embodiment, the terminal device may acquire each virtual interactive object in the game scene, and scale down the graphical appearance of each virtual interactive object to a corresponding exemplary graphic proportionally. For example, a virtual transaction entry (such as the virtual character or the weapons shop and the like), a virtual scene (such as a restaurant, a theater, and the like), and other virtual prop (such as NPC and the like) may be scaled down proportionally to, for example, an exemplary graphic of 30×30 pixels based on an original graphic appearance. In addition, the exemplary graphic corresponding to each virtual interactive object may be arranged according to a determined movement path. For example, each exemplary graphic may be arranged on two sides of the movement path, such that the user may browse each virtual interactive object when controlling the virtual character to move along the movement path. After arranging the exemplary graphic corresponding to each virtual interactive object, the terminal device may accordingly determine the display region of each virtual interactive object in the game scene according to an arrangement result, that is, the terminal device may determine which regions to display the exemplary graphic corresponding to each virtual interactive object according to the arrangement positioning assigned to each virtual interactive object. For example, in the example shown in FIG. 4, after determining the movement path 402 of the virtual character 401, the exemplary graphic of each virtual interactive object may be arranged on two sides of the movement path 402 according to the determined movement path 402, where the virtual interactive object may include, for example, a virtual transaction entry 4031, a virtual scene entry 4032, a virtual prop 4033 and another virtual character 4034; after the arrangement is completed, the terminal device may determine the display region of each virtual interactive object according to the arrangement result, and each display region may be, for example, as shown in a range outlined by dashed lines in FIG. 4.

In an example, the virtual interactive object may be arranged according to the movement path in the following way:

(a) the virtual interactive objects are randomly arranged on two sides of the movement path, that is, each virtual interactive object is randomly arranged on two sides of the movement path in a disorderly manner; in this way, there is no correlation between the virtual interactive object displayed in the game screen and its real position in the game scene, so as to provide the user with a higher degree of freedom to browse the stalls;

(b) the virtual interactive objects are sequentially arranged along the movement path according to relative positions between the virtual interactive objects and the movement path in the game scene. For example, after determining the movement path, the relative position between each virtual interactive object and the movement path is determined. For example, in the same region, there are three virtual interactive objects A, B, and C in sequence, the distances of which relative to the movement path are from near to far, and there is also a virtual interactive object D downstream of the region, when arranging each virtual interactive object from A to D along the movement path, each virtual interactive object may be arranged from upstream to downstream in a direction in which the virtual character is moving forward, in order of A, B, C, and D. In this way, the user experience of browsing virtual interactive objects is similar to the real-life strolling process, which helps to enhance the user's game immersion.

Figure 4:
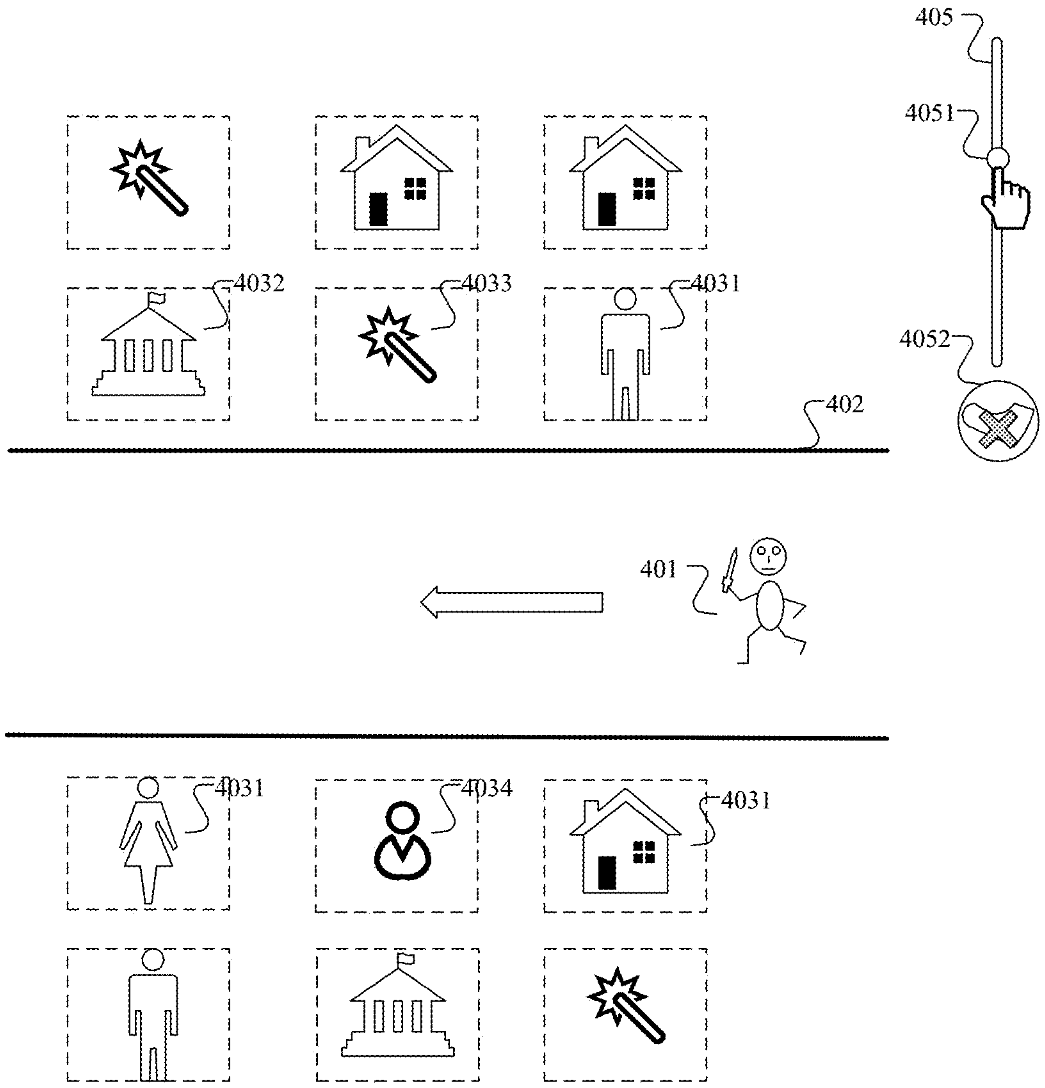
FIG. 4 shows a schematic diagram of arranging a virtual interactive object and determining a display region of the virtual interactive object according to an embodiment of the present disclosure.

In a further embodiment, the virtual interactive objects may also be arranged and aligned in two columns along two sides of the movement path. For example, as shown in FIG. 4, each virtual interactive object 4031, 4032, 4033 and 4034 may be arranged into two columns on two sides of the movement path 402. In this way, each virtual interactive object may be displayed to the user in a regular manner, and the difficulty for the user to select object to be interacted with from two columns of virtual interactive objects will be correspondingly reduced compared to the case of multiple columns of virtual interactive objects, which helps to reduce the difficulty for the user to select the object to be interacted with and improve the user experience.

In a further example, in the case that a large number of virtual interactive objects are arranged, offset processing may be performed on the virtual interactive objects at adjacent display positions, such that the virtual interactive objects will not occlude each other during display. For example, the terminal device may flexibly set the size of the display region used to display the virtual interactive object according to the number of virtual interactive objects to be displayed, and set an appropriate offset according to the size of the display region, such that when displaying each virtual interactive object, each virtual interactive object may be separated from each other due to the existence of the set offset, and do not occlude each other to affect browsing. In this way, each virtual interactive object may be displayed to the user in a clear and orderly manner, which helps to improve the browsing efficiency of the user.

In a further example, the terminal device may also receive screening information input by the user and screen the virtual interactive objects according to the screening information. The screening information may be specific information related to a type of virtual interactive object, such as a virtual transaction entry, a virtual scene entry, a virtual prop or another virtual character. When the virtual interactive object that the user is interested in is limited to the virtual transaction entry, the screening information may also be specific information related to item information of a transaction item corresponding to the virtual transaction entry. For example, the user may only be interested in the virtual prop in the game scene, in this case, the browse mode may provide a screening information input interface, and the user may manually input screening information in the screening information input interface or select the corresponding screening information in a drop-down menu, for example, input "virtual prop", to specify the virtual prop to be display in the game scene with priority through the screening information. When the virtual interactive object that the user is interested in is limited to the virtual transaction entry, that is, when the user is only interested in the virtual transaction item, for example, the user may only be interested in orange equipment in the protective gear type and priced less than 200 gold, and in this case, the user may manually input screening information in the screening information input interface or select the corresponding screening information in a drop-down menu, for example, input "protective gear", "orange", "less than 200 gold", to specify the virtual transaction entry to be displayed in the game scene with priority through the screening information. After receiving the screening information, the terminal device may screen each virtual interactive object according to the screening information and acquire the virtual interactive object that meets the requirements of the screening information. After that, the terminal device may display the screened virtual interactive object at a position closest to the movement path.

Figure 5:
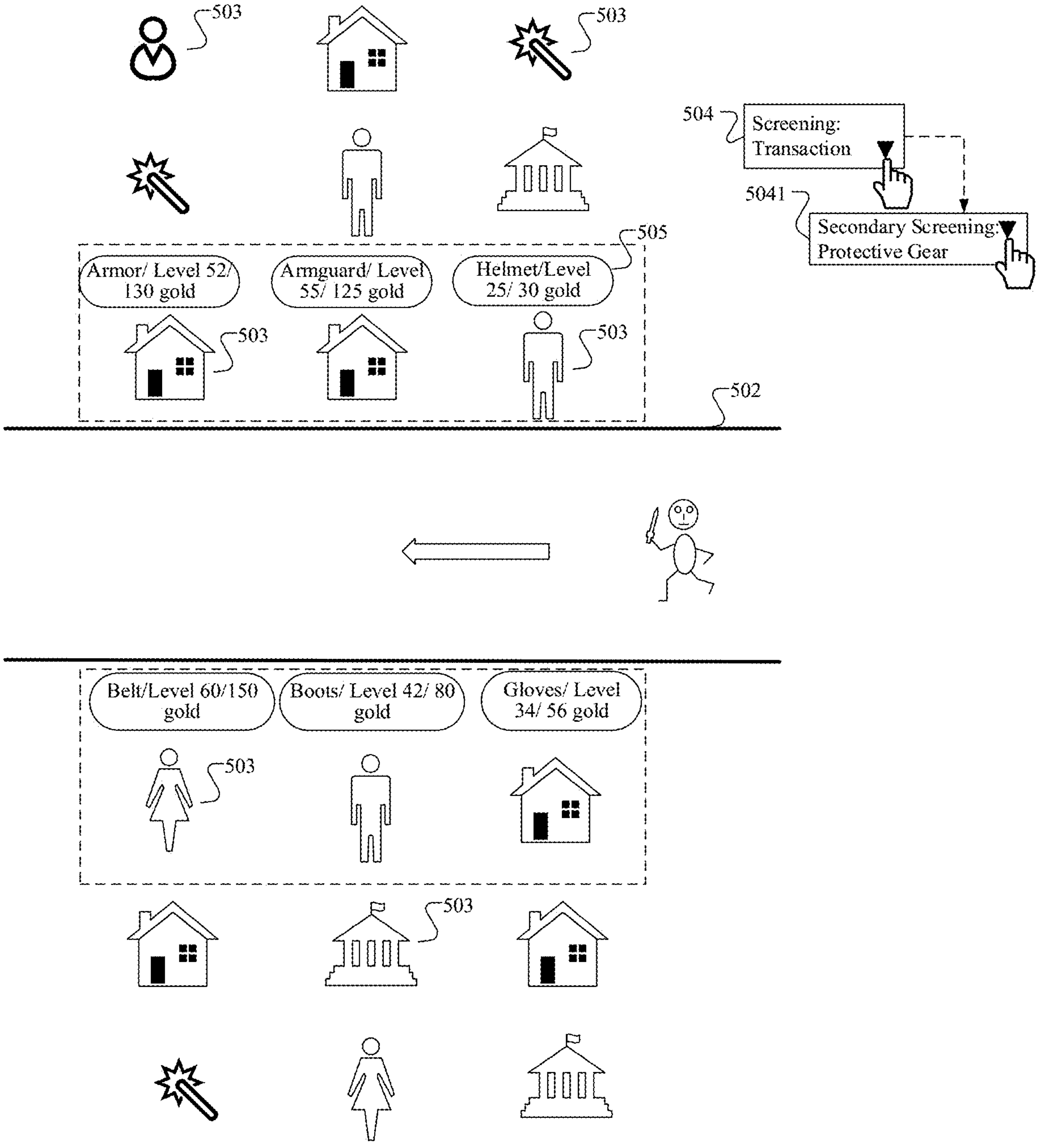
FIG. 5 shows a schematic diagram of arranging a virtual interactive object based on screening information according to an embodiment of the present disclosure.

For example, as shown in FIG. 5, the user may input screening condition information in a screening condition information input box 504 either manually or by selecting it from a drop-down menu. For example, in an example shown in FIG. 5, the user may choose to set the screening condition information as "transaction", and further set the "protective gear" as a secondary screening condition information in a screening condition information sub-box 5041 additionally provided under the "transaction". The terminal device may screen out a virtual interactive object provided with virtual transaction entry in each virtual interactive object 503 according to the screening information, screen out a stall or place for trading the "protective gear" in each virtual transaction entry, and as shown by the dashed box in FIG. 5, display the screened virtual transaction entry for selling the "protective gear" at a position closest to the movement path 502. In addition to its own exemplary graphic, the virtual transaction entry in the virtual interactive object may also render a text box 505, which is used to display the item information of the transaction item corresponding to the virtual transaction entry, i.e., a "signboard" similar to the stall, such that the user may intuitively understand basic information of the item to be traded by the virtual transaction entry. It should be noted that the secondary screening condition information may also be set to more than one piece of information according to actual needs, for example, the secondary screening condition information may be set to "protective gear", "orange", "less than 200 gold", etc. as described above, which is not specifically limited in this example. In this way, the specific virtual interactive object that the user is interested in may be prioritized and displayed, such that the user may browse the virtual interactive object of interest more quickly, thus helping to improve the browsing efficiency and enhance the user experience.

Figure 7:
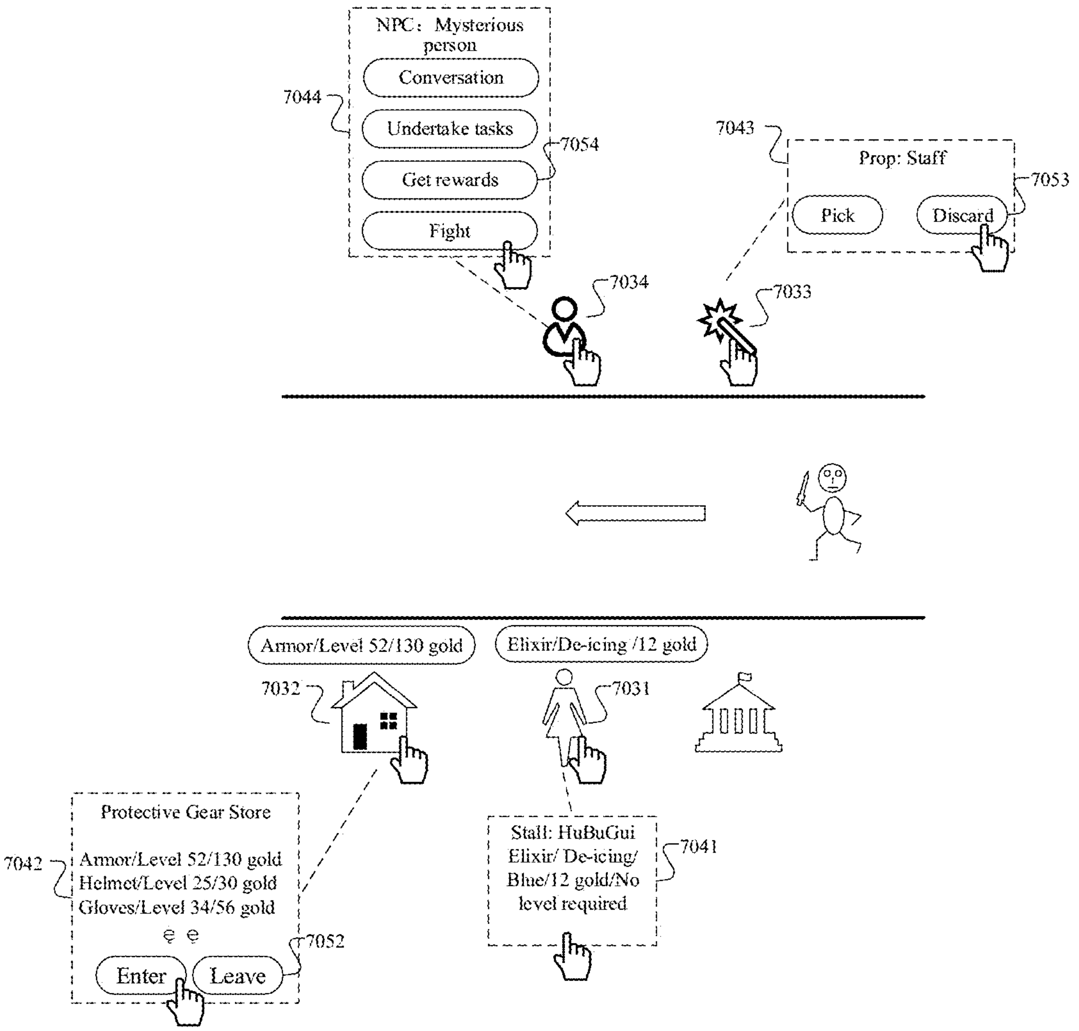
FIG. 7 shows a schematic diagram of an interactive interface according to an embodiment of the present disclosure.

In an embodiment, when at least one displayed virtual interactive object includes a virtual transaction entry, a transaction type of each virtual transaction entry may be determined, for example, the transaction type may be determined according to at least one piece of information in the item information of the transaction item associated with the virtual transaction entry, and the item information may include, for example, a name (such as helmet, antidote, etc.), a price, a type (such as protective gear, accessories, portions, etc.), a level, a quality (such as orange equipment, purple equipment), a virtual effect (such as detoxification, deicing), etc., of the transaction item. For example, according to the "quality" information in the item information, it may be determined which stall's transaction type is orange equipment, and which stall's transaction type is purple equipment, etc.; and according to the "type" information in the item information, it may be determined which stall's transaction type is protective gear, and which stall's transaction type is accessories, etc. Thus, in a case that a large number of the virtual transaction entries are required to be displayed and it is difficult to offset the virtual transaction entries at adjacent display positions, for example, as shown in FIG. 7, N virtual transaction entries belonging to the same transaction type may be combined and displayed as a single virtual transaction entry, and a quantity of combined virtual transaction entries may also be displayed; for example, 6 virtual transaction entries used to trade "protective gear" may be combined and displayed as "protective gear×6"; or display regions of N virtual transaction entries belonging to the same transaction type in the game scene may be set together, and that is, they may be gathered together in the same region for display; for example, a plurality of virtual transaction entries used to trade "accessories" are gathered at an "accessories region" on one side of the movement path for display, and a plurality of virtual transaction entries used to trade "consumables" are gathered at a "consumables region" on one side of the movement path for display, and the like. The above-mentioned N is a natural number greater than 1 and can be flexibly set according to actual needs. For example, when there are a large number of virtual transaction entries, N is set to 6, or when it is desired to show a large number of purple equipment to the user in a gathered manner, N is set to 20, etc., which is not specifically limited in this embodiment.

Figure 6:
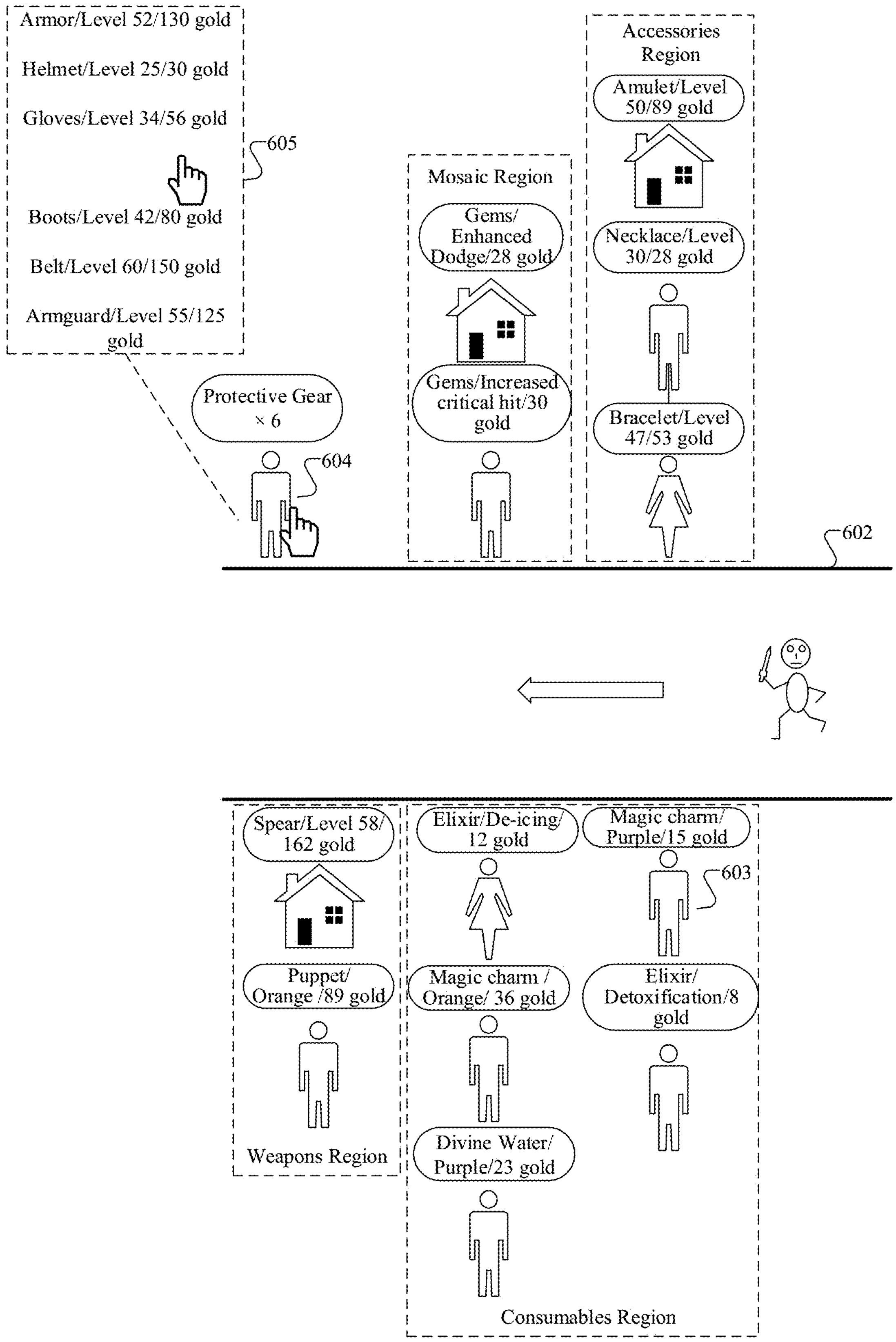
FIG. 6 shows a schematic diagram of displaying virtual interactive objects in clusters according to a type of a transaction item according to an embodiment of the present disclosure.

For example, as shown in FIG. 6, in the case that there are a plurality of virtual transaction entries, each virtual transaction entry may be gathered and displayed according to the "type" information in the item information of the transaction item corresponding to each virtual transaction entry 603. For example, consumables such as "magic charm", "elixir", and "divine water" may be gathered for display in the "consumables region" on one side of the movement path 602 as shown in the dashed box; and accessories such as "amulet", "necklace", and "bracelet" may be gathered for display in the "accessories region" on one side of the movement path 602 as shown in the dashed box, and the like. In addition, for example, 6 virtual transaction entries used to trade "protective gear" may also be combined and displayed as a single virtual transaction entry 604, and the single virtual transaction entry 604 may be identified in the form of, for example, "protective gear×6". When the user clicks the virtual transaction entry 604, a secondary display menu 605 may pop up, and the detailed item information for each of the combined 6 "protective gears" item may be displayed in the secondary display menu 605. The user may perform the transaction operation by clicking on the detailed item information of the corresponding "protective gears" item. Through the above examples, the virtual interactive object may be displayed in a concise and clear form, or the virtual interactive objects may be displayed in clusters, such that the user may more intuitively and quickly select the virtual interactive object to be browsed and to be interacted with among the required categories when browsing the virtual interactive objects, which helps the user to find the virtual interactive object of interest more conveniently, and helps to improve the browsing and shopping efficiency and to enhance the user experience.

In step S230, the virtual character is controlled to move at a preset speed in the game scene according to the movement path.

In the embodiment, the virtual character may be controlled to move at the preset speed along the determined movement path within the game scene to realize the experience of "strolling around stalls and browsing". The preset speed may, for example, allow the virtual character to move through 1/7 of the game screen per second. The preset speed may be set according to actual needs, such that neither the virtual character will move too fast and cause the user to have no time to view each virtual interactive object, nor the virtual character will move too slowly and cause the process of browsing to be protracted.

In an embodiment, a virtual movement control related to the movement of the virtual character may be generated in the browse mode, such that the user may control a movement speed of the virtual character through the virtual movement control. For example, as shown in FIG. 4, a virtual movement control 405 may be implemented in a form of a speed adjustment slide slot 405, which may include a speed adjustment slider 4051 that may be dragged and a stop button 4052 that may be clicked. For example, if the user passes through a certain region along the movement path, and finds that there are many virtual interactive objects of interest that need to be carefully screened, the user may input a speed adjustment command through the virtual movement control 405, such that the virtual character may move at a slower specified speed. For example, by dragging the speed adjustment slider 4051 generated in the game interface, the virtual character may move through 1/9 of the game screen per second. On the other hand, if the user considers that there are no virtual interactive object of interest in a certain region, he or she may accelerate the movement speed of the virtual character by inputting a speed adjustment command through the virtual movement control 405, such that the virtual character may pass through the region more quickly. If the user, for example, needs to interact with a certain virtual interactive object, the user may input a stop command through the virtual movement control 405 to stop the virtual character's movement. For example, by dragging the speed adjustment slider 4051 to the bottom of the speed adjustment slide lot or directly clicking a stop button 4052 generated below the speed adjustment slide slot, the movement speed of the virtual character may be reduced to 0, in order to suspend the process of browsing, and to provide sufficient time to complete the interaction. Correspondingly, in response to the speed adjustment command or stop command input by the user through the virtual movement control, the movement speed of the virtual character may be changed, e.g., by increasing or decreasing the movement speed, or by controlling the virtual character to stop the movement.

Through the above examples, the user may freely control the movement speed or stop of the virtual character in the scene, thus realizing a personalized experience of the rhythm of browsing, such that the user may better select the virtual interactive object to be interacted with, so as to improve the user experience.

In step S240, the at least one virtual interactive object is displayed on the graphical user interface according to a real-time movement position of the virtual character and based on the display region of the arranged virtual interactive object in the game scene.

In the present embodiment, as the virtual character moves along the movement path, each virtual interactive object may be displayed on the graphical user interface along the movement path (for example, on two sides of the movement path) according to the real-time movement position of the virtual character and based on the display region of the arranged virtual interactive object for display determined as described above. For example, as the virtual character moves forward along the movement path, the game scene on two sides of the movement path will change accordingly; and correspondingly, as described above, each virtual interactive object may be rendered as an exemplary graphic that is scaled down proportionally, and each exemplary graphic is displayed, for example, in the display region located on two sides of the movement path along the movement path. In this way, when the real-time movement position of the virtual character changes, the exemplary graphic of each virtual interactive object displayed on the game screen is also refreshed, thus bringing the user an experience of shopping and browsing similar to the reality.

In an embodiment, when the user determines the virtual interactive object to be interacted with, the user may click the exemplary graphic of the virtual interactive object to be interacted with through a touch screen of the terminal device; in response to a touch operation on the virtual interactive object, the terminal device may display an interactive interface corresponding to the virtual interactive object, such that the user may further interact with the virtual interactive object through the interactive interface. For example, in the example shown in FIG. 7, when the user clicks on the virtual transaction entry 7031, for example, formed by a stall set up by a player, an interactive interface 7041 may pop up, which may include, for example, item information of the transaction item corresponding to the virtual transaction entry 7031, and the user may further interact with the virtual transaction entry 7031 by clicking on the item information, and that is, to buy the transaction item corresponding to the virtual transaction entry 7031.

When the user clicks the virtual transaction entry 7032, for example, a virtual transaction entry formed by a virtual transaction place fixedly set up in the scene, the interactive interface 7042 may pop up, in addition to displaying some item information of transaction item similar to the interactive interface 7041, the interactive interface 7042 may further include an action interactive option 7052, and the user may control the virtual character to enter the virtual transaction place to select more transaction items by clicking the action interactive option 7052, or the user may control the virtual character to stop interacting with the virtual transaction entry 7032. When the user clicks the virtual interactive object corresponding to the virtual scene entry, an interactive option similar to the above action interactive option 7052 may also pop up, such that the user may choose to enter or leave the virtual scene.

When the user clicks a virtual interactive object 7033, for example, a virtual interactive object corresponding to a virtual prop, an interactive interface 7043 may pop up. The interactive interface 7043 may include an action interactive option 7053, and the user may control the virtual character to pick up the virtual prop by clicking the action interactive option 7053, or the user may control the virtual character to discard the virtual prop.

When the user clicks a virtual interactive object 7034, for example, a virtual interactive object corresponding to another virtual character, an interactive interface 7044 may pop up. The interactive interface 7044 may include an action interactive option 7054, and the user may control a series of interactive actions, such as conversing with the another virtual character, undertaking a task, getting a task reward, fighting, etc., by clicking on the action interactive option 7054.

It should be noted that in the example shown in FIG. 7, each interactive interface and the corresponding action interactive option are merely illustrative, the form and content of the interactive interface and action interactive option may be flexibly set according to the settings and actual needs of the game itself, which is not specifically limited in the present embodiment.

Through the above embodiments, the user may instantly provide an interface for quick interaction during the process of browsing various virtual interactive objects, so as to realize the browsing experience of "browsing while interacting", and provide the user with a realistic experience similar to real shopping and browsing while facilitating the user to find virtual interactive object of interest, which reduces the difficulty of the user to browse the virtual interactive object, and also helps to improve user's game immersion.

In a further embodiment, after displaying the interactive interface corresponding to the virtual interactive object, a movement speed of the virtual character may be reduced or the virtual character may be controlled to stop moving, such that the user may check the interactive interface and perform further interaction without missing the browsing of the subsequent virtual interactive object due to the continuous movement. Through the above embodiment, a convenient object interactive mode is provided for the user, such that the user may "browse while interacting" in the process of shopping and browsing, which is more close to the shopping and browsing experience in reality, thus helping to improve user's immersion.

In a further embodiment, after reducing the movement speed of the virtual character or controlling the virtual character to stop moving, the user may further control the movement of the virtual character through the virtual movement control as described above. For example, the user may input the speed adjustment command through the virtual movement control, such as by dragging the speed adjustment slider generated in the game interface, such that the virtual character moves at a slower specified speed or accelerates the movement speed. The user may also input the stop command through the virtual movement control, such as, by dragging the speed adjustment slider to the bottom of the slide slot or directly clicking the stop button generated below the speed adjustment slide slot, such that the virtual character stops moving. Correspondingly, in response to the speed adjustment command or stop command input by the user through the virtual movement control, the terminal device may control and change the movement speed of the virtual character, for example, increase or decrease the movement speed, or control the virtual character to stop moving. In this way, a personalized experience of the rhythm of browsing and shopping may be realized for the user, which helps to enhance user experience.

It should be noted that although the various steps of the methods of the present disclosure are depicted in the drawings in a particular order, this does not require or imply that the steps must be performed in that particular order, or that all of the steps shown must be performed to achieve the desired the results. Additionally or alternatively, certain steps may be omitted, multiple steps may be combined into one step for execution, and/or one step may be decomposed into multiple steps for execution, etc.

Figure 8:
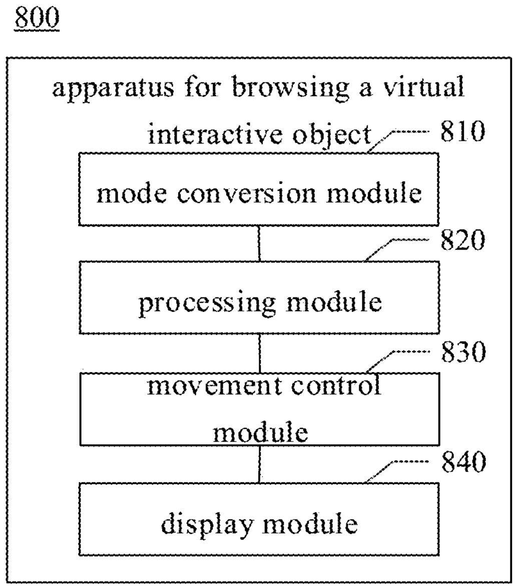
FIG. 8 shows a block diagram of an apparatus for displaying a virtual interactive object according to an embodiment of the present disclosure.

Further, in an embodiment, an apparatus for displaying a virtual interactive object is also provided, a graphical user interface is provided by a terminal device, at least a virtual character in a game scene is displayed on the graphical user interface, the game scene includes at least one virtual interactive object. Referring to FIG. 8, the apparatus for displaying the virtual interactive object 800 may include a mode conversion module 810, a processing module 820, a movement control module 830, and a display module 840:

the mode conversion module 810 may be configured to switch to a browse mode in response to a browse mode switch trigger command, and acquire the movement path of the virtual character in the game scene;

the processing module 820 may be configured to arrange the virtual interactive object according to the movement path, and determine a display region of the arranged virtual interactive object in the game scene;

the movement control module 830 may be configured to control the virtual character to move at a preset speed in the game scene according to the movement path;

the display module 840 may be configured to display the at least one virtual interactive object on the graphical user interface according to a real-time movement position of the virtual character and based on the display region of the arranged virtual interactive object in the game scene.

In an embodiment of the present disclosure, the virtual interactive object may include a virtual transaction entry, a virtual scene entry, a virtual prop or another virtual character.

In an embodiment of the present disclosure, the mode conversion module 810 may determine the movement path according to received path information.

In an embodiment of the present disclosure, the received path information may include at least one of: path line information drawn by a user, start point and end point information input by a user or virtual interactive object filtering information.

In an embodiment of the present disclosure, the mode conversion module 810 may also be configured to hide a virtual interactive element displayed on the graphical user interface in the browse mode, and generate a virtual movement control related to a movement of the virtual character.

In an embodiment of the present disclosure, the movement control module 830 may also be configured to change a movement speed of the virtual character in response to a speed adjustment command input through the virtual movement control; or control the virtual character to stop moving in response to a stop command input through the virtual moving control.

In an embodiment of the present disclosure, the display module 840 may be configured to randomly arrange the virtual interactive objects on two sides of the movement path; or sequentially arrange the virtual interactive objects along the movement path according to relative positions between the virtual interactive objects and the movement path in the game scene.

In an embodiment of the present disclosure, the display module 840 may also be configured to arrange and align the virtual interactive objects in two columns along two sides of the movement path.

In an embodiment of the present disclosure, the display module 840 may also be configured to offset virtual interactive objects at adjacent display positions such that the virtual interactive objects do not occlude each other during display.

In an embodiment of the present disclosure, the display module 840 may also be configured to receive screening information and perform screening on the virtual interactive objects according to the screening information; and arrange a screened virtual interactive object at a position closest to the movement path.

In an embodiment of the present disclosure, the display module 840 may also be configured to determine a transaction type of each virtual transaction entry when at least one displayed virtual interactive object includes a virtual transaction entry; combine and display N virtual transaction entries belonging to the same transaction type as a single virtual transaction entry; or set display regions of N virtual transaction entries belonging to a same transaction type in the game scene together; where N is a natural number greater than 1.

In an embodiment of the present disclosure, the processing module 820 may also be configured to display an interactive interface corresponding to the virtual interactive object in response to a touch operation on the virtual interactive object.

In an embodiment of the present disclosure, the movement control module 830 may also be configured to reduce a movement speed of the virtual character or control the virtual character to stop moving after displaying the interactive interface corresponding to the virtual interactive object.

In an embodiment of the present disclosure, the browse mode also includes a virtual movement control, and the movement control module 830 may be configured to, after the movement speed of the virtual character is reduced or after the virtual character is controlled to stop moving, change the movement speed of the virtual character in response to a speed adjustment command input through the virtual movement control; or control the virtual character to stop moving in response to a stop command input through the virtual movement control.

The specific details of each module or unit in the above apparatus for displaying the virtual interactive object have been described in detail in the corresponding method for displaying the virtual interactive object, and therefore will not be repeated here.

Figure 9:
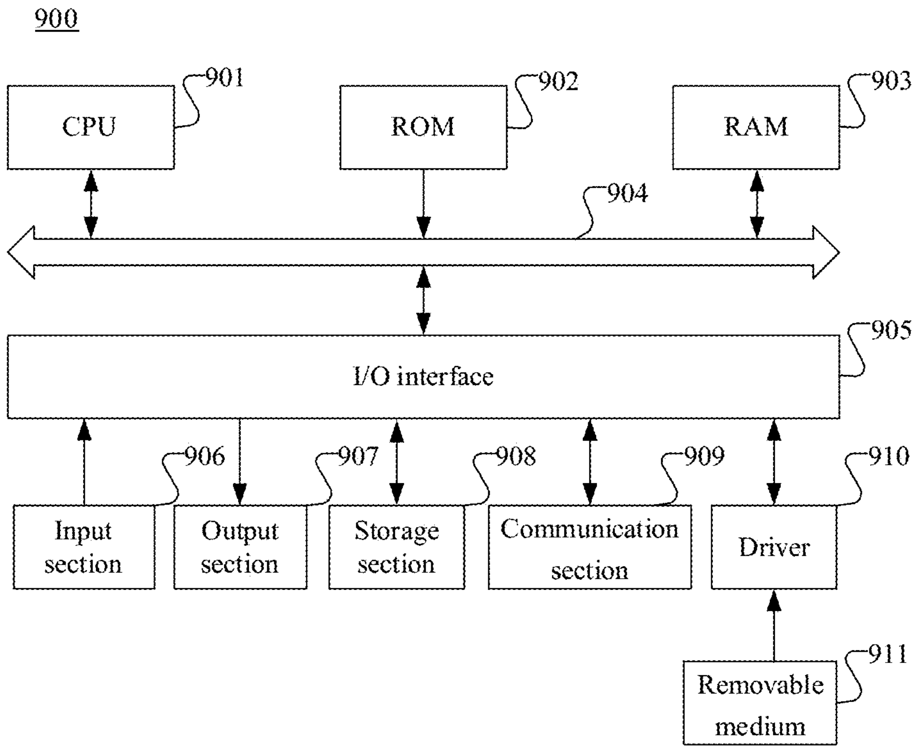
FIG. 9 shows a structural diagram of a computer system of an electronic device applicable for implementing an embodiment of the present disclosure.

FIG. 9 shows a schematic structural diagram of a computer system of an electronic device applicable for implementing the embodiments of the present disclosure.

It should be noted that a computer system 900 of the electronic device shown in FIG. 9 is only an example, and should not limit the functions and application scope of the embodiments of the present disclosure.

As shown in FIG. 9, the computer system 900 includes a central processing unit (CPU) 901 which can perform various appropriate actions and processes according to programs stored in a read-only memory (ROM) 902 or loaded into a random access memory (RAM) 903 from a storage section 908. Various programs and data required for system operation are also stored in the RAM 903. The CPU 901, ROM 902, and RAM 903 are connected to each other via a bus 904. An input/output (I/O) interface 905 is also connected to the bus 904.

The following components are connected to the I/O interface 905: an input section 906 including a keyboard, a mouse, etc.; an output section 907 including a cathode ray tube (CRT) display, a liquid crystal display (LCD), and a speaker, etc.; the storage section 908 including a hard disk, etc.; and a communication section 909 including a network interface card such as a LAN card, a modem, or the like. The communication section 909 performs communication processing via a network such as the Internet. A driver 910 is also connected to the I/O interface 905 as needed. A removable medium 911 such as a magnetic disk, optical disk, magneto optical disk, semiconductor memory, etc. is mounted on the driver 910 as needed, so that a computer program read therefrom is installed into the storage section 908 as needed.

In particular, according to an embodiment of the present disclosure, the processes described below with reference to the flowcharts can be implemented as computer software programs. For example, embodiments of the present disclosure provide a computer program product, which includes a computer program carried on a computer-readable medium, where the computer program includes program codes for executing the methods shown in the flowcharts. In such an embodiment, the computer program may be downloaded and installed from a network via the communication section 909, and/or installed from the removable medium 911. When the computer program is executed by the central processing unit (CPU) 901, various functions defined in the method and device of the present disclosure are performed.

For example, a graphical user interface is provided by a terminal device, at least a virtual character in a game scene is displayed on the graphical user interface, the game scene includes at least one virtual interactive object, and the method for displaying includes:

switching to, in response to a browse mode switch trigger command, a browse mode, and determining a movement path of the virtual character in the game scene;

arranging, according to the movement path, the virtual interactive object, and determining a display region of the arranged virtual interactive object in the game scene;

controlling the virtual character to move at a preset speed in the game scene according to the movement path; and displaying the at least one virtual interactive object on the graphical user interface according to a real-time movement position of the virtual character and based on the display region of the arranged virtual interactive object in the game scene.

In an embodiment, the virtual interactive object includes a virtual transaction entry, a virtual scene entry, a virtual prop or another virtual character.

In an embodiment, obtaining the movement path of the virtual character in the game scene includes: determining the movement path according to received path information.

In an embodiment, the received path information includes at least one of: path line information drawn by a user, start point and end point information input by a user or virtual interactive object filtering information.

In an embodiment, the method further includes: hiding a virtual interactive element displayed on the graphical user interface in the browse mode, and generating a virtual movement control related to a movement of the virtual character.

In an embodiment, the method further includes: changing, in response to a speed adjustment command input through the virtual movement control, a movement speed of the virtual character; or controlling, in response to a stop command input through the virtual movement control, the virtual character to stop moving.

In an embodiment, arranging the virtual interactive object according to the movement path includes: randomly arranging the virtual interactive objects on two sides of the movement path; or sequentially arranging, according to relative positions between the virtual interactive objects and the movement path in the game scene, the virtual interactive objects along the movement path.

In an embodiment, the method further includes: arranging and aligning the virtual interactive objects in two columns along two sides of the movement path.

In an embodiment, the method further includes: offsetting virtual interactive objects at adjacent display positions such that the virtual interactive objects do not occlude each other during display.

In an embodiment, the method further includes: receiving screening information, and performing screening on the virtual interactive objects according to the screening information; and arranging a screened virtual interactive object at a position closest to the movement path.

In an embodiment, the method further includes: when at least one displayed virtual interactive object includes a virtual transaction entry, determining a transaction type of each virtual transaction entry; combining and displaying N virtual transaction entries belonging to a same transaction type as a single virtual transaction entry; or setting display regions of N virtual transaction entries belonging to a same transaction type in the game scene together; where N is a natural number greater than 1.

In an embodiment, the method further includes: in response to a touch operation on the virtual interactive object, displaying an interactive interface corresponding to the virtual interactive object.

In an embodiment, after displaying the interactive interface corresponding to the virtual interactive object, the method further includes: reducing a movement speed of the virtual character, or controlling the virtual character to stop moving.

In an embodiment, the browse mode further includes a virtual movement control; after reducing the movement speed of the virtual character or after controlling the virtual character to stop moving, the method further includes: changing, in response to a speed adjustment command input through the virtual movement control, the movement speed of the virtual character; or controlling, in response to a stop command input through the virtual movement control, the virtual character to stop moving.

In the above manner, on the one hand, the virtual interactive object is regularly displayed in the game scene along the movement path of the virtual character, which solves the problem of stall setup and messy display at least to a certain extent, reduces the difficulty for the user to select the stall of interest, avoids the need for the user to move the virtual character back and forth to find a suitable stall, and reduces the user's fatigue during the game. On the other hand, the virtual interactive object in the game is displayed along the movement path of the virtual character, such that the user may get a real experience of shopping and viewing stalls in the game scene similar to that in real life, and it also solves the problem that when there are a plurality of virtual interactive objects in the same scene, the interaction between the user and the corresponding object is affected since each virtual interactive object occludes each other, which helps to improve the user experience and enhance the user's immersion.

In another aspect, the present disclosure further provides a non-transitory computer-readable medium, which may be contained in the electronic device as described in the above embodiments; or may be separate and not assembled into the electronic device. The non-transitory computer-readable medium carries one or more programs that, when the one or more programs are executed by one such electronic device, cause the electronic device to implement the method as described in the above embodiments.

For example, a graphical user interface is provided by a terminal device, at least a virtual character in a game scene is displayed on the graphical user interface, the game scene includes at least one virtual interactive object, and the method for displaying includes:

switching to, in response to a browse mode switch trigger command, a browse mode, and determining a movement path of the virtual character in the game scene;

arranging, according to the movement path, the virtual interactive object, and determining a display region of the arranged virtual interactive object in the game scene;

controlling the virtual character to move at a preset speed in the game scene according to the movement path; and displaying the at least one virtual interactive object on the graphical user interface according to a real-time movement position of the virtual character and based on the display region of the arranged virtual interactive object in the game scene.

In an embodiment, the virtual interactive object includes a virtual transaction entry, a virtual scene entry, a virtual prop or another virtual character.

In an embodiment, obtaining the movement path of the virtual character in the game scene includes: determining the movement path according to received path information.

In an embodiment, the received path information includes at least one of: path line information drawn by a user, start point and end point information input by a user or virtual interactive object filtering information.

In an embodiment, the method further includes: hiding a virtual interactive element displayed on the graphical user interface in the browse mode, and generating a virtual movement control related to a movement of the virtual character.

In an embodiment, the method further includes: changing, in response to a speed adjustment command input through the virtual movement control, a movement speed of the virtual character; or controlling, in response to a stop command input through the virtual movement control, the virtual character to stop moving.

In an embodiment, arranging the virtual interactive object according to the movement path includes: randomly arranging the virtual interactive objects on two sides of the movement path; or sequentially arranging, according to relative positions between the virtual interactive objects and the movement path in the game scene, the virtual interactive objects along the movement path.

In an embodiment, the method further includes: arranging and aligning the virtual interactive objects in two columns along two sides of the movement path.

In an embodiment, the method further includes: offsetting virtual interactive objects at adjacent display positions such that the virtual interactive objects do not occlude each other during display.

In an embodiment, the method further includes: receiving screening information, and performing screening on the virtual interactive objects according to the screening information; and arranging a screened virtual interactive object at a position closest to the movement path.

In an embodiment, the method further includes: when at least one displayed virtual interactive object includes a virtual transaction entry, determining a transaction type of each virtual transaction entry; combining and displaying N virtual transaction entries belonging to a same transaction type as a single virtual transaction entry; or setting display regions of N virtual transaction entries belonging to a same transaction type in the game scene together; where N is a natural number greater than 1.

In an embodiment, the method further includes: in response to a touch operation on the virtual interactive object, displaying an interactive interface corresponding to the virtual interactive object.

In an embodiment, after displaying the interactive interface corresponding to the virtual interactive object, the method further includes: reducing a movement speed of the virtual character, or controlling the virtual character to stop moving.

In an embodiment, the browse mode further includes a virtual movement control; after reducing the movement speed of the virtual character or after controlling the virtual character to stop moving, the method further includes: changing, in response to a speed adjustment command input through the virtual movement control, the movement speed of the virtual character; or controlling, in response to a stop command input through the virtual movement control, the virtual character to stop moving.

In the above manner, on the one hand, the virtual interactive object is regularly displayed in the game scene along the movement path of the virtual character, which solves the problem of stall setup and messy display at least to a certain extent, reduces the difficulty for the user to select the stall of interest, avoids the need for the user to move the virtual character back and forth to find a suitable stall, and reduces the user's fatigue during the game. On the other hand, the virtual interactive object in the game is displayed along the movement path of the virtual character, such that the user may get a real experience of shopping and viewing stalls in the game scene similar to that in real life, and it also solves the problem that when there are a plurality of virtual interactive objects in the same scene, the interaction between the user and the corresponding object is affected since each virtual interactive object occludes each other, which helps to improve the user experience and enhance the user's immersion.

It should be noted that the non-transitory computer-readable medium shown in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage medium may include, but are not limited to, electrical connections with one or more wires, portable computer diskettes, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, the computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave, carrying computer-readable program code therein. Such propagated data signals may be in a variety forms, including, but not limited to, electromagnetic signals, optical signals, or any suitable combination thereof. The computer-readable signal medium may also be any computer-readable medium other than the computer-readable storage medium, and the computer-readable medium can send, propagate, or transmit a program for use by or in conjunction with an instruction execution system, apparatus, or device. The program code contained on the computer-readable medium may be transmitted using any appropriate medium, including, but not limited to: wireless, wire, optical cable, RF, etc., or any suitable combination thereof.

The flowchart and block diagrams in the drawings illustrate the architecture, functionality, and operation of possible implementations of systems, methods and computer program products according to various embodiments of the present disclosure. In this regard, each block in a flowchart or block diagram may represent a module, program segment, or portion of code that includes one or more executable instructions to perform a specific logical function. It should also be noted that, in some alternative implementations, the functions noted in the block may occur out of the order noted in the drawings. For example, two blocks shown in succession may, in fact, be executed substantially concurrently, or they may sometimes be executed in the reverse order, depending upon the functionality involved. It should also be noted that each block in the block diagrams or flowcharts, and combinations of blocks in the block diagrams or flowcharts, can be implemented by a dedicated hardware-based system that performs the specified function or operation, or can be implemented by a combination of dedicated hardware and computer instructions.

It should be understood that the present disclosure is not limited to the precise constructions which have been described above and shown in the drawings, and various modifications and changes may be made without departing from the scope thereof. The scope of the present disclosure is limited only by the appended claims.

What is claimed is:

1. A method for displaying a virtual interactive object, comprising:

providing a graphical user interface by a terminal device, wherein a virtual character in a game scene is displayed on the graphical user interface, the game scene comprises a plurality of virtual interactive objects, wherein the virtual interactive object comprises a stall, and the stall is a virtual transaction entry for a virtual item transaction;

entering, in response to a browse mode switch trigger command, a browse mode, and determining a movement path of the virtual character in the game scene;

dynamically arranging, according to the movement path, the plurality of virtual interactive objects;

determining a display region of the arranged virtual interactive objects in the game scene;

controlling the virtual character to move at a preset speed in the game scene according to the movement path; and displaying the virtual interactive objects on the graphical user interface according to a real-time movement position of the virtual character and based on the display region of the arranged virtual interactive objects in the game scene.

2. The method according to claim 1, wherein the virtual interactive object comprises at least one of: a virtual scene entry, a virtual prop or another virtual character.

3. The method according to claim 1, wherein determining the movement path of the virtual character in the game scene comprises:

determining the movement path according to received path information.

4. The method according to claim 3, wherein the received path information comprises at least one of: path line information drawn by a user, start point and end point information input by a user or virtual interactive object filtering information.

5. The method according to claim 1, further comprising:

hiding a virtual interactive element displayed on the graphical user interface in the browse mode, and generating a virtual movement control related to a movement of the virtual character.

6. The method according to claim 5, further comprising:

changing, in response to a speed adjustment command input through the virtual movement control, a movement speed of the virtual character; or controlling, in response to a stop command input through the virtual movement control, the virtual character to stop moving.

7. The method according to claim 1, wherein arranging the plurality of virtual interactive objects according to the movement path comprises:

randomly arranging the plurality of virtual interactive objects on two sides of the movement path; or sequentially arranging, according to relative positions between the plurality of virtual interactive objects and the movement path in the game scene, the plurality of virtual interactive objects along the movement path.

8. The method according to claim 7, further comprising:

arranging and aligning the plurality of virtual interactive objects in two columns along two sides of the movement path.

9. The method according to claim 8, further comprising:

offsetting virtual interactive objects at adjacent display positions, wherein the virtual interactive objects at the adjacent display positions do not occlude each other during display.

10. The method according to claim 7, further comprising:

receiving screening information, and performing screening on the plurality of virtual interactive objects according to the screening information; and arranging a screened virtual interactive object at a position closest to the movement path.

11. The method according to claim 2, further comprising:

in response to determining that the displayed virtual interactive object comprises the virtual transaction entry, determining a transaction type of each virtual transaction entry;

combining and displaying N virtual transaction entries belonging to a same transaction type as a single virtual transaction entry; or setting display regions of N virtual transaction entries belonging to a same transaction type in the game scene together;

wherein N is a natural number greater than 1.

12. The method according to claim 1, further comprising:

in response to a touch operation on the virtual interactive object, displaying an interactive interface corresponding to the virtual interactive object.

13. The method according to claim 12, further comprising:

reducing a movement speed of the virtual character, or controlling the virtual character to stop moving.

14. The method according to claim 13, wherein the browse mode further comprises a virtual movement control; and the method further comprises:

changing, in response to a speed adjustment command input through the virtual movement control, the movement speed of the virtual character; or controlling, in response to a stop command input through the virtual movement control, the virtual character to stop moving.

15. An electronic device, comprising:

a memory; and a processor coupled to the memory, wherein the processor is configured to:

provide a graphical user interface by a terminal device, wherein a virtual character in a game scene is displayed on the graphical user interface, the game scene comprises a plurality of virtual interactive objects, wherein the virtual interactive object comprises a stall, and the stall is a virtual transaction entry for a virtual item transaction;

enter, in response to a browse mode switch trigger command, a browse mode, and determine a movement path of the virtual character in the game scene;

dynamically arrange, according to the movement path, the plurality of virtual interactive objects, determine a display region of the arranged virtual interactive objects in the game scene;

control the virtual character to move at a preset speed in the game scene according to the movement path; and display the virtual interactive object on the graphical user interface according to a real-time movement position of the virtual character and based on the display region of the arranged virtual interactive object in the game scene.

16. A non-transitory computer-readable storage medium having stored a computer program thereon, wherein the computer program, when executed by a processor, causes the processor to:

provide a graphical user interface by a terminal device, wherein a virtual character in a game scene is displayed on the graphical user interface, the game scene comprises a plurality of virtual interactive objects, wherein the virtual interactive object comprises a stall, and the stall is a virtual transaction entry for a virtual item transaction;

enter, in response to a browse mode switch trigger command, a browse mode, and determine a movement path of the virtual character in the game scene;

dynamically arrange, according to the movement path, the plurality of virtual interactive objects;

determine a display region of the arranged virtual interactive objects in the game scene;

control the virtual character to move at a preset speed in the game scene according to the movement path; and display the virtual interactive object on the graphical user interface according to a real-time movement position of the virtual character and based on the display region of the arranged virtual interactive object in the game scene.

17. The method according to claim 5, wherein hiding the virtual interactive element comprises:

stopping rendering the virtual interactive element, wherein the virtual interactive element comprises at least one of: an interactive control, an information graphics or a prompt text.

18. The method according to claim 11, wherein the transaction type of each virtual transaction entry is determined at least one piece of item information of a transaction item associated with the virtual transaction entry, and the item information comprises at least one of: a name of the transaction item, a price of the transaction item, a type of the transaction item, a level of the transaction item, a quality of the transaction item, or a virtual effect of the transaction item.

19. The method according to claim 6, wherein the virtual movement control is a speed adjustment slide slot, and the speed adjustment slide slot comprises a speed adjustment slider or a stop button;

receiving a speed adjustment command input by a user dragging the speed adjustment slider; or receiving the stop command input by a user dragging the speed adjustment slider to a bottom of the speed adjustment slide lot or clicking the stop button.

20. The electronic device according to claim 15, wherein the virtual interactive object comprises at least one of: a virtual scene entry, a virtual prop or another virtual character.

* * * * *